Oct. 9, 1923.

M. C. SCHWEINERT 1,469,966

TIRE VALVE

Filed March 28, 1918

WITNESS :

INVENTOR :
Maximilian Charles Schweinert
By Attorneys,

Patented Oct. 9, 1923.

1,469,966

UNITED STATES PATENT OFFICE.

MAXIMILIAN CHARLES SCHWEINERT, OF WEST HOBOKEN, NEW JERSEY.

TIRE VALVE.

Application filed March 28, 1918. Serial No. 225,162.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Tire Valves, of which the following is a specification.

This invention relates to improvements in tire valves and aims to provide certain improvements therein.

The invention is particularly adapted to a repair part for use in connection with the European type of valve, although it is, of course, susceptible to use in an original structure. The European type of valve comprises a shell or casing formed with an interior tapered seat near its top and the valve proper comprises an elongated plug adapted to fit within the casing and provided with a lateral opening. Surrounding the lower part of the plug is an elastic sleeve which normally hugs the plug, especially to prevent back-pressure of air, while being sufficiently elastic to permit ingress of air through the lateral opening and downwardly past the sleeve. The plug is commonly provided with a tapered shoulder adapted to engage the internal tapered shoulder of the shell, and a packing being provided to make a tight joint between the two. Usually this packing is formed of the upper end of the elastic sleeve. The upper end of the shell is slotted to receive a pair of lugs carried by the plug, and a swivelled sleeve or coupling is provided to connect the plug and shell.

According to the present invention I provide preferably a repair part which is designed to be coupled with the shell of such a structure, which repair part is adapted to enclose a valve inside of the American type, so that if a tire is already provided with a European valve, and the valve proper becomes injured, the American repair part can be easily substituted for it without removing the shell from the tire tube. The invention also includes other features whereby such repair part may carry both the European and the American valves proper, or either of such valves proper. The invention includes other features which will be hereinafter more fully described.

Referring to the drawings, which illustrate several forms of the invention:

Figure 2:
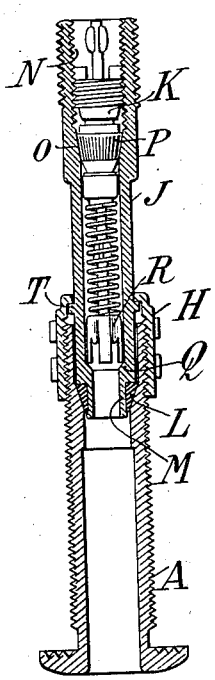
Fig. 2 is a diametrical section of both parts.
Figure 3:
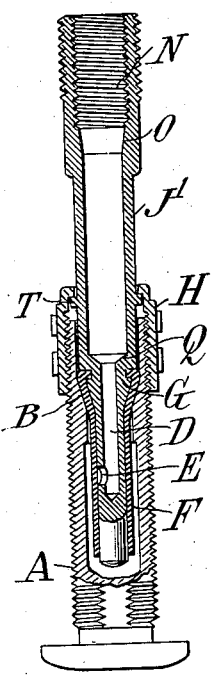
Fig. 3 is an alternative form of the invention.

Referring to the drawings, let A indicate a valve shell of the European type which comprises generally a tubular member having near its top a tapered shoulder B, its upper end being slotted as shown at C. The valve shell A is adapted normally to receive a valve proper, the working parts of which are illustrated in Figure 3. This valve proper comprises a plug having a central bore D and a lateral opening E, which plug extends into the valve shell, and is provided therein with an elastic sleeve F in the form of a rubber tube which normally hugs the exterior of the plug, and so closes the opening E. Air entering the central bore D passes outwardly through the lateral opening E and separates the elastic tube from the plug sufficiently to permit its escape into the lower part of the valve shell. The plug is provided with a tapered shoulder G adapted to engage the tapered shoulder B formed in the valve shell and the elastic sleeve F usually extends up sufficiently to cover the shoulder G, and thus form a packing for the valve proper. It will be understood that the ordinary European type of valve proper does not conform in its upper part to Figure 3 but is provided with a screw-threaded nipple of smaller diameter adapted to receive a pump coupling. It is also formed with lugs which enter the slots C and are held in place by a sleeve or coupling similar to that illustrated at H in Fig. 3. The type of valve thus described, while in common use abroad, is not adapted to receive a tire gauge so that it is practically impossible to determine the pressures in tires to which the valve is applied For this and other reasons it is desirable to provide a means for substituting a supplemental part, by means of which the valve may be reconstituted to provide a working structure when the original insides are injured or destroyed. It is also desirable that such replacement part shall be capable of operative connection with a tire gauge. To these ends in one form of the invention I provide a supplemental casing J which is adapted to receive within it a valve proper and working parts as indicated by the letter K, which valve parts are of the well-known Schrader type. The lower end of the casing J carries a packing L which is preferably tapered to seat on the shoulder B of the shell A. This packing is preferably carried in a groove M, as best seen in Fig. 2.

The supplemental casing J is best formed with an internal thread N at its upper end and a shoulder O which is tapered to engage a packing P carried by the valve insides. At the lower end of the supplemental casing J is a shoulder Q adapted to serve as an abutment for the spring-holder R of the valve inside.

Figure 1:
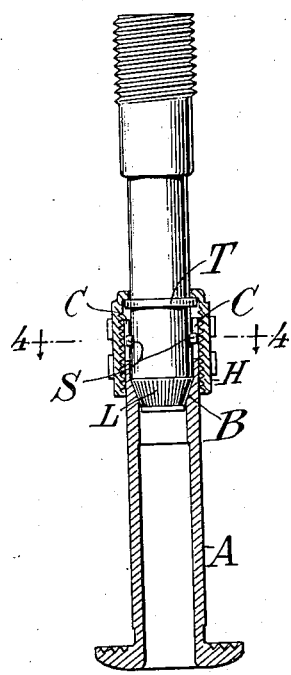
Figure 1 is a diametrical section of the valve shell, showing the invention in elevation.
Figure 4:
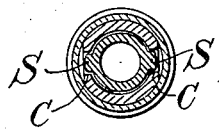
Fig. 4 is a cross-section on the line 4—4 in Fig. 1.

The exterior of the supplemental casing is formed with lugs S S (see Figs. 1 and 4) which fit in the slots C of the shell A. The coupling sleeve H bears against an integral collar T (Fig. 1) and screws on the shell A until the packing L is sufficiently compressed to make a tight joint.

By means of this construction the old insides may be deliberately removed and the new parts substituted without necessitating any change in the connection of the valve shell with the tire tube, and the valve may be thus fitted for the reception of a Schrader inside for connection with a gauge.

The invention further includes a construction such as illustrated in Fig. 3, wherein a single supplemental casing J' is provided which is capable of being used either as a foreign valve or domestic valve. In such construction the lower part of the valve which has already been described is preferably formed integral with the upper part of the casing, and the upper part is constructed with a thread N, shoulder O and shoulder Q adapted to receive the Schrader insides. By this construction the valve may be repaired either by the introduction of a new Schrader inside, or by the introduction of a new tube F. If desired, both may be used concurrently.

While I have shown and described several forms of the invention, I do not wish to be limited thereto, since various changes may be made therein without departing from the spirit of the invention.

What I claim is:—

1. The combination with a shell adapted to be secured to a tube or the like, said shell having a bore adapted to receive a valve proper having an elastic sleeve, and said shell having a tapered shoulder adapted to engage a packing on said valve proper, of a supplemental casing adapted to be secured to said shell, said supplemental casing being open at its top and having a bore of sufficient diameter to receive through its top the working parts of a standard valve comprising a seat, and a movable valve proper, said bore opening into said shell and communicating with said tire tube through said shell, said casing and valve parts being adapted to replace said first-named valve structure when the latter is removed.

2. The combination of a shell adapted to be secured to a tube or the like, and a supplemental casing adapted to enter said shell, said casing having a bore at its lower end terminating in a lateral opening, said bore opening into said shell and communicating with said tire tube through said shell, and said lower end being adapted to receive an elastic sleeve, and said casing having at its upper part a bore, and a shoulder in said bore, said bore being of sufficient diameter to receive through its top valve mechanism comprising a valve and its seat.

3. The combination of a shell adapted to be secured to a tube or the like, and a supplemental casing adapted to enter said shell, said casing having at its lower end a bore terminating in a lateral opening, said bore opening into said shell and communicating with said tire tube through said shell, and such lower end being adapted to receive an elastic sleeve to constitute with said opening a valve, and the upper end of said casing having a tapered shoulder and a screw-threaded bore above said shoulder and being open at its top and being of sufficient diameter to receive through its top the working parts of a standard valve comprising a valve proper and its seat.

In witness whereof, I have hereunto signed my name.

MAXIMILIAN CHARLES SCHWEINERT.